(12) United States Patent
Romriell et al.

(10) Patent No.: US 10,186,170 B1
(45) Date of Patent: *Jan. 22, 2019

(54) TEXT CAPTION ERROR CORRECTION

(71) Applicant: Sorenson IP Holdings, LLC, Salt Lake City, UT (US)

(72) Inventors: Joseph N. Romriell, Alpine, UT (US); Scot Brooksby, Salt Lake City, UT (US); Shane Arthur Roylance, Farmington, UT (US); Brian Chevrier, Salt Lake City, UT (US); Robert Cochran Puzey, North Ogden, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,087

(22) Filed: Apr. 11, 2016

Related U.S. Application Data (63) Continuation of application No. 14/530,407, filed on Oct. 31, 2014, now Pat. No. 9,336,689, which is a
(Continued)

(51) Int. Cl.
*G09B 21/00* (2006.01)
*G10L 15/26* (2006.01)
(Continued)

(52) U.S. Cl.
CPC ........... *G09B 21/009* (2013.01); *G06F 17/24* (2013.01); *G06F 17/273* (2013.01); *G06F 17/2765* (2013.01); *G10L 15/26* (2013.01)

(58) Field of Classification Search
CPC .................................................. G09B 21/009

USPC ............ 379/52, 88.13, 201.01, 88.14, 93.15, 379/265.02; 434/362, 156, 112; 600/301; 700/94; 704/3, 365, 235, 240,
(Continued)

(56) References Cited

U.S. PATENT DOCUMENTS

| 4,777,469 A | 10/1988 | Engelke et al. |
| 4,959,847 A | 9/1990 | Engelke et al. |

(Continued)

FOREIGN PATENT DOCUMENTS

EP    1091303    4/2001

OTHER PUBLICATIONS

*Ultratec, Inc. and Captel, Inc., Plaintiffs v. Sorenson Communications, Inc. and Captioncall, LLC., Defendants*, Opinion and Order of the United States District Court for the Western District of Wisconsin, dated Aug. 28, 2014.
(Continued)

*Primary Examiner* — Gerald Gauthier
(74) *Attorney, Agent, or Firm* — Maschoff Brennan (57) ABSTRACT

Systems and methods related to providing error correction in a text caption are disclosed. A method may comprise displaying a text caption including one or more blocks of text on each of a first device and a second device remote from the first device. The method may also include generating another block of text and replacing a block of text of the text caption with the other block of text. Furthermore, the method may include displaying the text caption on the second device having the block of text of the first text caption replaced by the other block of text.

20 Claims, 4 Drawing Sheets

Related U.S. Application Data continuation of application No. 13/768,918, filed on Feb. 15, 2013, which is a continuation of application No. 12/624,973, filed on Nov. 24, 2009, now Pat. No. 8,379,801.

(51) Int. Cl.
  *G06F 17/24*  (2006.01)
  *G06F 17/27*  (2006.01)

(58) Field of Classification Search
  USPC ...... 704/251; 705/2, 764; 709/206; 717/120, 717/124; 725/135; 715/764, 769
  See application file for complete search history.

(56) References Cited

U.S. PATENT DOCUMENTS

| | | | |
|---|---|---|---|
| 5,081,673 A | 6/1992 | Engelke et al. | |
| 5,146,502 A * | 9/1992 | Davis | G09B 21/00 379/52 |
| 5,163,081 A * | 11/1992 | Wycherley | H04M 3/42391 379/265.02 |
| 5,325,417 A | 6/1994 | Engelke et al. | |
| 5,327,479 A | 7/1994 | Engelke et al. | |
| 5,351,288 A | 9/1994 | Engelke et al. | |
| 5,432,837 A | 7/1995 | Engelke et al. | |
| D364,865 S | 12/1995 | Engelke et al. | |
| 5,572,423 A | 11/1996 | Church et al. | |
| 5,574,784 A * | 11/1996 | LaPadula | H04M 3/51 379/265.02 |
| 5,576,955 A | 11/1996 | Newbold et al. | |
| 5,581,593 A | 12/1996 | Engelke et al. | |
| 5,604,786 A | 2/1997 | Engelke et al. | |
| 5,636,340 A | 6/1997 | Bonneau et al. | |
| 5,680,443 A * | 10/1997 | Kasday | H04M 3/51 340/4.1 |
| 5,687,222 A | 11/1997 | McLaughlin et al. | |
| 5,712,901 A * | 1/1998 | Meermans | H04M 3/42391 370/428 |
| 5,715,370 A | 2/1998 | Luther et al. | |
| 5,724,405 A * | 3/1998 | Engelke | H04M 1/2475 379/52 |
| 5,754,737 A | 5/1998 | Gipson | |
| 5,809,112 A | 9/1998 | Ryan | |
| 5,809,425 A | 9/1998 | Colwell et al. | |
| 5,855,000 A | 12/1998 | Waibel et al. | |
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,101,467 A * | 8/2000 | Bartosik | G10L 15/26 704/235 |
| 6,174,170 B1 | 1/2001 | Olmedo | |
| 6,175,819 B1 | 1/2001 | Van Alstine | |
| 6,233,314 B1 | 5/2001 | Engelke | |
| 6,243,445 B1 | 6/2001 | Begeja et al. | |
| 6,260,011 B1 | 7/2001 | Heckerman et al. | |
| 6,307,921 B1 | 10/2001 | Engelke et al. | |
| 6,314,397 B1 | 11/2001 | Lewis et al. | |
| 6,360,010 B1 | 3/2002 | Hu et al. | |
| 6,473,778 B1 | 10/2002 | Gibbon | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,513,003 B1 | 1/2003 | Angell et al. | |
| 6,549,611 B2 | 4/2003 | Engelke et al. | |
| 6,567,503 B2 * | 5/2003 | Engelke | G10L 15/26 379/100.09 |
| 6,568,939 B1 | 5/2003 | Edgar | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,816,834 B2 | 11/2004 | Jaroker | |
| 6,820,055 B2 | 11/2004 | Saindon et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 6,940,617 B2 | 9/2005 | Ma et al. | |
| 6,941,345 B1 * | 9/2005 | Kapil | H04L 12/1818 709/206 |
| 6,944,593 B2 | 9/2005 | Kuzunuki et al. | |
| 6,990,335 B1 | 1/2006 | Shamoon et al. | |
| 6,999,932 B1 | 2/2006 | Zhou | |
| 7,003,082 B2 | 2/2006 | Engelke et al. | |
| 7,006,604 B2 | 2/2006 | Engelke | |
| 7,035,804 B2 | 4/2006 | Saindon et al. | |
| 7,130,401 B2 | 10/2006 | Rampey et al. | |
| 7,130,790 B1 | 10/2006 | Flanagan et al. | |
| 7,164,753 B2 | 1/2007 | Engelke et al. | |
| 7,197,459 B1 | 3/2007 | Harinarayan et al. | |
| 7,269,561 B2 | 9/2007 | Mukhtar et al. | |
| 7,295,882 B2 * | 11/2007 | Champion | G06F 11/0706 700/94 |
| 7,305,627 B2 | 12/2007 | Tannenbaum | |
| 7,315,612 B2 | 1/2008 | McClelland | |
| 7,319,740 B2 | 1/2008 | Engelke et al. | |
| 7,376,561 B2 | 5/2008 | Rennillo et al. | |
| 7,428,702 B1 | 9/2008 | Cervantes et al. | |
| 7,444,285 B2 | 10/2008 | Forbes | |
| 7,483,833 B2 | 1/2009 | Peters | |
| 7,511,761 B2 | 3/2009 | Lynch | |
| 7,516,404 B1 | 4/2009 | Colby | |
| 7,539,086 B2 | 5/2009 | Jaroker | |
| 7,543,033 B2 | 6/2009 | Vincent | |
| 7,555,104 B2 | 6/2009 | Engelke | |
| 7,660,398 B2 * | 2/2010 | Engelke | H04M 3/42391 379/52 |
| 7,698,140 B2 | 4/2010 | Bhardwaj et al. | |
| 7,734,702 B2 * | 6/2010 | Kim | H04L 51/04 709/206 |
| 7,769,586 B2 | 8/2010 | Bennett et al. | |
| 7,774,694 B2 | 8/2010 | Watson et al. | |
| 7,792,675 B2 | 9/2010 | Ramaswamy et al. | |
| 7,826,635 B2 | 11/2010 | Barbara | |
| 7,881,441 B2 * | 2/2011 | Engelke | H04M 3/42391 379/52 |
| 7,908,145 B2 | 3/2011 | Bennett et al. | |
| 8,140,337 B2 | 3/2012 | Nakazawa et al. | |
| 8,150,689 B2 | 4/2012 | Beach et al. | |
| 8,195,459 B1 * | 6/2012 | Brand | G06F 17/30705 704/231 |
| 8,213,578 B2 * | 7/2012 | Engleke | G10L 15/26 379/52 |
| 8,296,811 B1 | 10/2012 | Begeja et al. | |
| 8,355,914 B2 | 1/2013 | Joh et al. | |
| 8,379,801 B2 * | 2/2013 | Romriell | G06F 17/273 345/173 |
| 8,408,913 B2 * | 4/2013 | Palacios | G09B 19/06 434/156 |
| 8,416,925 B2 * | 4/2013 | Engelke | G10L 15/265 379/52 |
| 8,515,024 B2 | 8/2013 | Engelke et al. | |
| 8,515,748 B2 | 8/2013 | Gangemi et al. | |
| 8,626,486 B2 * | 1/2014 | Och | G06F 17/28 704/2 |
| 8,775,175 B1 | 7/2014 | Nagel et al. | |
| 8,898,633 B2 * | 11/2014 | Bryant | G05B 19/056 717/106 |
| 9,336,689 B2 | 5/2016 | Romriell et al. | |
| 9,350,857 B1 | 5/2016 | Engelke et al. | |
| 2001/0005825 A1 | 6/2001 | Engelke et al. | |
| 2001/0047258 A1 | 11/2001 | Rodrigo | |
| 2001/0047270 A1 | 11/2001 | Gusick et al. | |
| 2002/0055974 A1 | 5/2002 | Hawkes et al. | |
| 2002/0091832 A1 | 7/2002 | Low et al. | |
| 2002/0120647 A1 | 8/2002 | Amano | |
| 2002/0194278 A1 | 12/2002 | Golan | |
| 2003/0023689 A1 | 1/2003 | Brown et al. | |
| 2003/0028448 A1 | 2/2003 | Joseph et al. | |
| 2003/0046350 A1 | 3/2003 | Chintalapati et al. | |
| 2003/0125950 A1 | 7/2003 | Avila et al. | |

(56) References Cited

U.S. PATENT DOCUMENTS

| | | | |
|---|---|---|---|
| 2003/0161447 A1* | 8/2003 | Kind | H04N 7/147 379/88.13 |
| 2003/0177009 A1 | 9/2003 | Odinak et al. | |
| 2003/0187659 A1 | 10/2003 | Cho et al. | |
| 2004/0019638 A1 | 1/2004 | Makagon et al. | |
| 2004/0064317 A1 | 4/2004 | Othmer et al. | |
| 2004/0204941 A1 | 10/2004 | Israch et al. | |
| 2005/0069107 A1 | 3/2005 | Tanaka et al. | |
| 2005/0086702 A1* | 4/2005 | Cormack | G06F 17/289 725/135 |
| 2005/0094777 A1* | 5/2005 | McClelland | H04M 3/42391 379/52 |
| 2005/0096910 A1 | 5/2005 | Watson et al. | |
| 2005/0102140 A1 | 5/2005 | Davne et al. | |
| 2005/0131840 A1 | 6/2005 | Pintsov et al. | |
| 2005/0226394 A1 | 10/2005 | Engelke et al. | |
| 2005/0226398 A1* | 10/2005 | Bojeun | H04L 12/2854 379/93.15 |
| 2005/0283726 A1 | 12/2005 | Lunati | |
| 2005/0289130 A1 | 12/2005 | Cohen et al. | |
| 2006/0047767 A1 | 3/2006 | Dodrill et al. | |
| 2006/0064631 A1 | 3/2006 | Parker | |
| 2006/0092291 A1 | 5/2006 | Bodie | |
| 2006/0095550 A1 | 5/2006 | Nemmaier et al. | |
| 2006/0101406 A1* | 5/2006 | Goenka | G06F 11/3664 717/124 |
| 2006/0161631 A1 | 7/2006 | Lira | |
| 2007/0118373 A1 | 5/2007 | Wise et al. | |
| 2007/0118374 A1 | 5/2007 | Wise et al. | |
| 2007/0124387 A1 | 5/2007 | Galloway | |
| 2007/0271510 A1 | 11/2007 | Grigoriu et al. | |
| 2007/0280463 A1* | 12/2007 | Kouchri | H04Q 3/66 379/201.01 |
| 2008/0097743 A1* | 4/2008 | Hong | G06F 17/289 704/3 |
| 2008/0155411 A1 | 6/2008 | Christensen | |
| 2008/0160491 A1* | 7/2008 | Allen | G09B 5/00 434/362 |
| 2008/0177623 A1 | 7/2008 | Fritsch et al. | |
| 2008/0187108 A1 | 8/2008 | Engelke et al. | |
| 2008/0260032 A1 | 10/2008 | Hu et al. | |
| 2008/0288250 A1 | 11/2008 | Rennillo et al. | |
| 2009/0037171 A1 | 2/2009 | McFarland et al. | |
| 2009/0089086 A1* | 4/2009 | Schoenberg | G06Q 30/08 705/2 |
| 2009/0112623 A1* | 4/2009 | Schoenberg | G06F 19/327 705/2 |
| 2009/0112852 A1 | 4/2009 | Kim et al. | |
| 2009/0192782 A1 | 7/2009 | Drewes | |
| 2009/0263098 A1 | 10/2009 | Hyun et al. | |
| 2009/0286210 A1* | 11/2009 | Spreen | G09B 21/009 434/112 |
| 2009/0319927 A1* | 12/2009 | Beeman | G06F 17/24 715/764 |
| 2009/0326938 A1 | 12/2009 | Marila et al. | |
| 2010/0063815 A1 | 3/2010 | Cloran et al. | |
| 2010/0135486 A1 | 6/2010 | Schneider | |
| 2010/0138221 A1 | 6/2010 | Boys | |
| 2010/0169073 A1 | 7/2010 | Almagro | |
| 2010/0222649 A1* | 9/2010 | Schoenberg | G06F 19/3418 600/301 |
| 2010/0287486 A1* | 11/2010 | Coddington | G06F 3/0236 715/769 |
| 2010/0332217 A1 | 12/2010 | Wintner et al. | |
| 2011/0018812 A1 | 1/2011 | Baird | |
| 2011/0040754 A1 | 2/2011 | Peto et al. | |
| 2011/0081007 A1* | 4/2011 | Bar-Yoav | H04L 12/587 379/88.13 |
| 2011/0123003 A1 | 5/2011 | Romriell et al. | |
| 2012/0130706 A1 | 5/2012 | Qiu et al. | |
| 2012/0178073 A1* | 7/2012 | Wasmund | A63F 9/18 434/362 |
| 2012/0250836 A1 | 10/2012 | Engleke et al. | |
| 2012/0250837 A1 | 10/2012 | Engleke et al. | |
| 2013/0158995 A1 | 6/2013 | Romriell et al. | |
| 2015/0051908 A1 | 2/2015 | Romriell et al. | |

OTHER PUBLICATIONS

United States Patent and Trademark Office, Before the Patent Trial and Appeal Board pleading, *Ultratec, Inc.* v. *CaptionCall, LLC*, Patent Owner's Response to Decision in Institute Inter Partes Review dated Jan. 30, 2014, 60 pages.

United States Patent and Trademark Office, Before the Patent Trial and Appeal Board pleading, *Ultratec, Inc.* v. *Sorenson Communications, Inc., CaptionCall, LLC, and Wilmington Trust, National Association*, Petitioner's Reply Under 37 C.F.R. 42.23 dated Apr. 16, 2014, 19 pages.

United States Patent and Trademark Office, Before the Patent Trial and Appeal Board pleading, *Ultratec, Inc.* v. *CaptionCall, LLC*, Notice of Disclaimer of Claims 1, 2, 7 and 9 of U.S. Pat. No. 8,379,801 dated Jul. 1, 2014, 5 pages.

United States Patent and Trademark Office, Before the Patent Trial and Appeal Board pleading, *Ultratec, Inc.* v. *Sorenson Communictions, Inc., CaptionCall, LLC, and Wilmington Trust, National Association*, Decision re Petitioner's Request for Rehearing, dated Jan. 10, 2014, 6 pages.

7908145United States Patent and Trademark Office, Before the Patent Trial and Appeal Board pleading, *Ultratec, Inc.* v. *Sorenson Communications, Inc., CaptionCall, LLC, and Wilmington Trust, National Association*, Request for Rehearing Under 37 C.F.R. 42.71(D) dated Nov. 27, 2013, 9 pages.

United States Patent and Trademark Office, Before the Patent Trial and Appeal Board pleading, *Ultratec, Inc.* v. *CaptionCall, LLC*, Decision re Institution of Inter Partes Review, dated Nov. 13, 2013, 25 pages.

Disclaimer in Patent Under 37 C.F.R. 1.321(a) for U.S. Pat. No. 8,379,801 dated Jun. 30, 2014.

Petition for Inter Partes Review of U.S. Pat. No. 8,379,801 (including exhibits) dated May 17, 2013.

Advantage Software, About Us webshot; www.eclipsecat.com/contentfabout-us; May 15, 2013, 1 page.

E-Tips Newsletter, Norton 360: Outstanding Protection; Nov. 2007; Issue 71, 6 pages.

CapTel News, News & Helpful Tips for People Who Use CapTel, Summer 2007, newsletter.

User Guide to Sprint CapTel Services, as early as Mar. 2009.

All CapTel 800 Phones are being updated, Press Release, <http://www.kcdhh.org/bulletin/CapTel800Update.pdf>, as early as Oct. 2011.

CapTel News from Ultratec—Jul. 2005.

*Ultratec, Inc.*, v. *CaptionCall, LLC.*, IPR2013-00288, Final Written Decision dated Oct. 30, 2014.

Inter Partes Review U.S. Pat. No. 9,336,689, Exhibit 1001 "Declaration of Ivan Zatkovich", filed May 9, 2017, 106 pages.

Inter Partes Review U.S. Pat. No. 9,336,689, Exhibit 1002 "Declaration of Meme Hilley", filed May 9, 2017, 6 pages.

Petition for Inter Partes Review of U.S. Pat. No. 8,379,801, Exhibit 1012, filed May 17, 2013, 68 pages.

Edmund A. Williams, et al., "National Association of Broadcasters: Engineering Handbook, 10th Edition", 2007, 21 pages.

Inter Partes Review Case No. IPR2013-00288, Exhibit 1011, "Final Written Decision", dated Oct. 30, 2014, 29 pages.

"Notice of Allowance" dated Oct. 7, 2014, in U.S. Appl. No. 13/768,918, 7 pages.

"Terminal Disclaimer to Obviate a Double Patenting Rejection Over a "Prior" Patent" filed on Sep. 9, 2014, in U.S. Appl. No. 13/768,918, 1 page.

"Decision on Petition Under CFR 1.313(c)(2)" dated Nov. 4, 2014, in U.S. Appl. No. 13/768,918, 1 page.

"Notice of Abandonment" dated Jun. 17, 2015, in U.S. Appl. No. 13/768,918, 2 pages.

Office Action Response filed on Sep. 25, 2014, in U.S. Appl. No. 13/768,918, 8 pages.

(56) References Cited

OTHER PUBLICATIONS

"Notice of Allowance" dated Feb. 26, 2016, in U.S. Appl. No. 14/530,407, 8 pages.
Office Action Response filed on Jan. 19, 2016, in U.S. Appl. No. 14/530,407, 11 pages.
Non-Final Office Action dated Oct. 22, 2015, in U.S. Appl. No. 14/530,407, 7 pages.
James Martin, "Design of Man-Computer Dialogues", 1973, 17 pages.
Dorothy Smith, "Communication in the Courtroom: Technology Is Helping Provide Equal Access to the Law", 1989, 3 pages.
Joseph Shapiro, "Technology No Longer Distances Deaf Culture", May 1, 2006, 4 pages.
Lloyd Vries, "Pagers Become Lifeline for Deaf", www.cbsnews.com, Nov. 1, 2006, 2 pages.
Susan Donaldson James, "Deaf and Proud to Use Sign Language", Dec. 12, 2006, 3 pages.
Petition for Inter Partes Review of U.S. Pat. No. 9,336,689, dated May 9, 2017, 79 pages.
"Americans with Disabilities Act of 1990, the ADA Amendments Act of 2008, and 28 CFR Part 35: Title II Guidelines for the State Courts System of Florida", Jan. 2009, 43 pages.
"Settlement Agreement Between the United States of America and the Florida State Courts System", dated May 31, 1996, 8 pages.
"Florida State Courts System Provision of Real-Time Court Reporting Services for Attorneys with Disabilities", Dated Oct. 30, 2007, 4 pages.
Marcele M. Soviero, "Captioning Could be a Boon to Many Viewers", "Popular Science", Oct. 1993, 3 pages.
"Report, In the Matter of Closed Captioning and Video Description of Video Programming", Dated Jul. 25, 1996, 62 pages.
Decision Institution of Inter Partes Review received in IPR2017-01394, U.S. Pat. No. 9,336,689 B2, Nov. 30, 2017.
Judgment received in IPR2017-01394, U.S. Pat. No. 9,336,689 B2, Feb. 27, 2018.

\* cited by examiner

TEXT CAPTION ERROR CORRECTION

CROSS-REFERENCE TO RELATED APPLICATION

This application is a continuation of U.S. patent application Ser. No. 14/530,407, filed Oct. 14, 2014, which application is a continuation of U.S. patent application Ser. No. 13/768,918, filed Feb. 15, 2013, which application is a continuation of U.S. patent application Ser. No. 12/624,973, filed Nov. 24, 2009, now U.S. Pat. No. 8,379,801, issued Feb. 19, 2013, the disclosure of each of which is hereby incorporated herein by this reference in its entirety.

TECHNICAL FIELD

Embodiments of the disclosure relate generally to text captioning and more specifically to correction of errors within a text caption.

BACKGROUND

Modern telecommunication services provide features to assist those who are deaf or hearing-impaired. One such feature is a telecommunication device for the deaf (TDD). Hearing-capable users communicate with hearing-impaired users who are users of TDD devices through so-called "relays." A relay is a telecommunication intermediary service, which is intended to permit a deaf or a hearing-impaired person to utilize a normal telephone network. A relay service may include an operator, referred to as a "call assistant," who serves as a human intermediary between a hearing user and a hearing-impaired user. The call assistant communicates with the hearing-impaired user using a TDD and communicates with the hearing user by voice over a standard telephone line.

A text captioned telephone system employs a relay service in a mode where the relay transmits both the voice of the hearing user and a text stream of the words spoken by the hearing user. A hearing-impaired user using a text captioned telephone, or telephone enabled to do text enhanced telephony, may carry on a normal telephone conversation with a hearing user while a text transcription of the words spoken by the hearing user is displayed on the text captioned telephone. The text transcription may allow the hearing-impaired user to confirm his or her understanding of the words spoken by the hearing user.

More specifically, during a communication session, a call assistant may listen to the voice signal of a hearing user and "revoice" the words to a speech recognition computer program tuned to that call assistant's voice. A text transcription output from the speech recognition computer is then transmitted to the text captioned telephone being used by the hearing-impaired user. Even with revoicing provided by a trained call assistant, the text transcription received by the hearing-impaired user may include errors. Therefore, correction of the errors within the text transcription may be required.

According to various conventional methods, errors within a text caption are corrected by either backspacing an error in a text caption and displaying corrected text or providing a corrected portion (e.g., a word or a sentence) at the end of a previously provided text caption. Although, backspacing an error in a text caption and displaying corrected text may provide a hearing-impaired user with a context for the correction, this method is distracting to a hearing-impaired user and interrupts the continuity of a conversation between a hearing-impaired user and a hearing user. Further, providing a corrected portion at the end of a previously provided text caption not only interrupts the continuity of a conversation but also fails to provide context of the correction to the hearing-impaired user. Therefore, a hearing-impaired user must determine where the corrected text should be inserted into the previously provided text caption.

A need exists to improve text correction of a text captioning system. Specifically, there is a need for methods of providing text caption correction while providing a user with context of a correction and without distracting the user or interrupting the continuity of a conversation between a hearing-impaired user and a hearing user.

BRIEF SUMMARY

In one embodiment of the disclosure, a method of providing error correction in a text caption is disclosed. The method may comprise displaying a text caption including one or more blocks of text on each of a first device and a second device remote from the first device. The method may also include generating another block of text and replacing a block of text of the text caption with the another block of text. Furthermore, the method may include displaying the text caption on the second device having the block of text of the first text caption replaced by the another block of text.

In another embodiment of the disclosure, a communication system is provided. The communication system may include a plurality of devices, wherein each device of the plurality includes a processor and a computer-readable medium coupled to the processor. The communication system may further include a plurality of application programs, wherein each application program is stored in an associated computer-readable medium. When executed by the processor, one or more application programs are configured to display a text caption including one or more blocks of text on a display device of each of a first device of the plurality of devices and a second device of the plurality of devices. One or more application programs may be configured to generate another block of text and replace one block of text of the text caption with the another block of text. Furthermore, one or more application programs may be configured to display the corrected text caption on the display device of the second device, wherein the at least one block of text of the text caption is replaced by the another block of text.

Another embodiment of the disclosure may include a computer-readable media storage medium storing instructions that when executed by a processor cause the processor to perform instructions in accordance with one or more embodiments of the disclosure.

DETAILED DESCRIPTION

In the following detailed description, reference is made to the accompanying drawings which form a part hereof and, in which is shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the disclosure in unnecessary detail. Furthermore, specific implementations shown and described are only examples and should not be construed as the only way to implement the disclosure unless specified otherwise herein. Block definitions and partitioning of logic between various blocks represent a specific implementation. It will be readily apparent to one of ordinary skill in the art that the various embodiments of the disclosure may be practiced by numerous other partitioning solutions. For the most part, details concerning timing considerations, and the like, have been omitted where such details are not necessary to obtain a complete understanding of the disclosure in its various embodiments and are within the abilities of persons of ordinary skill in the relevant art.

Referring in general to the following description and accompanying drawings, various aspects of the disclosure are illustrated to show its structure and method of operation. Common elements of the illustrated embodiments are designated with like numerals. It should be understood the figures presented are not meant to be illustrative of actual views of any particular portion of the actual structure or method, but are merely idealized representations which are employed to more clearly and fully depict the disclosure.

When executed as firmware or software, the instructions for performing the methods and processes described herein may be stored on a computer readable medium. A computer readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

Figure 1:
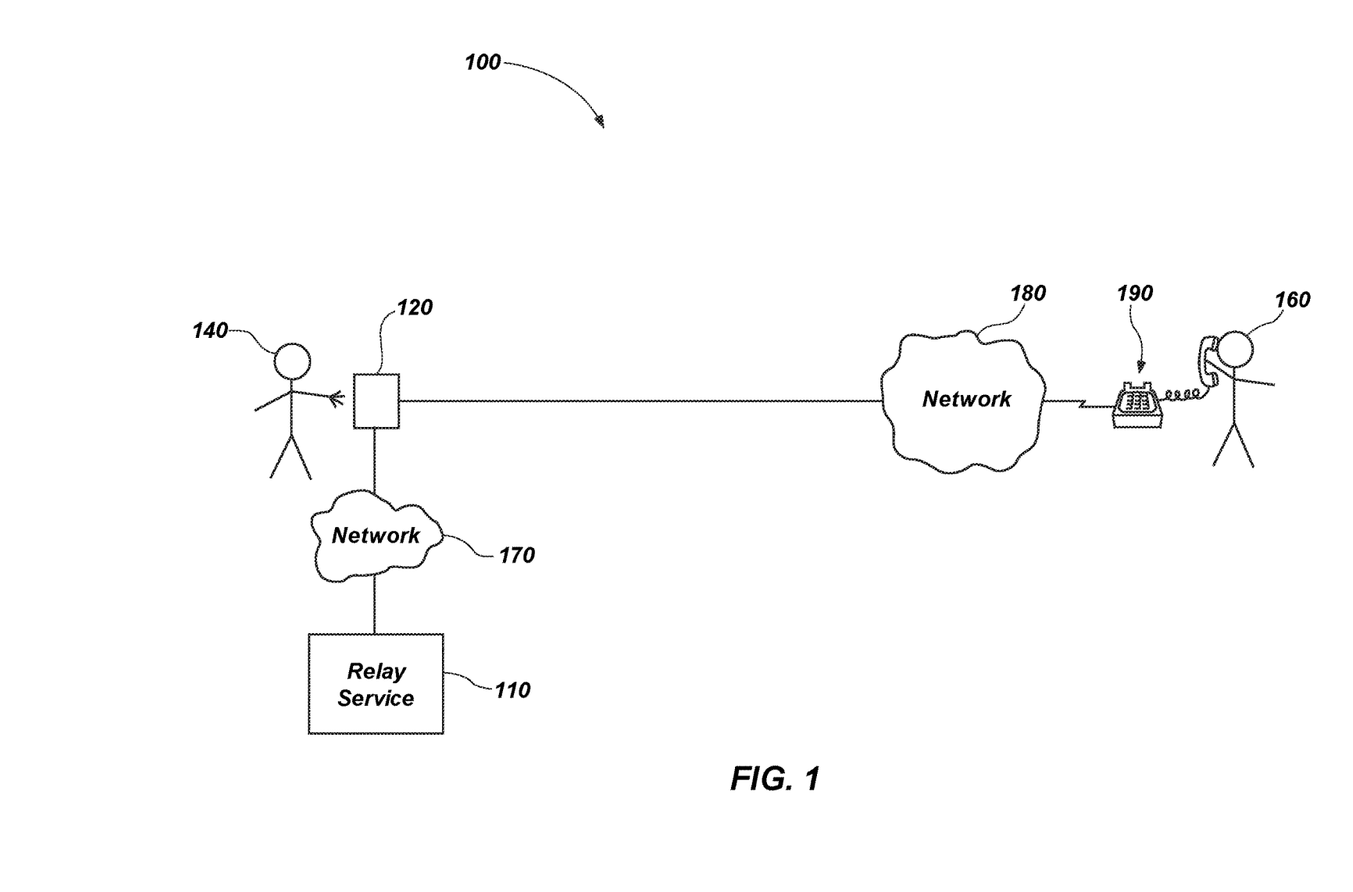
FIG. 1 illustrates a hearing-impaired communication system, in accordance with an embodiment of the disclosure.

FIG. 1 illustrates a communication system 100 configured to facilitate a communication session between a hearing-impaired user and a hearing-capable user, in accordance with one or more embodiments of the disclosure. Communication system 100 may include communication device 120, communication device 190, and a relay service 110. Communication device 190 may be coupled to communication device 120 via a network 180 and communication device 120 may be coupled to relay service 110 via a network 170. For example only, network 170 and network 180 may each be implemented according to the standards and bandwidth requirements of a telephone network such as the Public Switch Telephone Network (PSTN). The use of the term "telephone network" as used herein also contemplates networks that are compatible and configured to provide communications using digital standards, an example of which includes Voice Over Internet Protocol (VOIP). By way of example and not limitation, enhanced bandwidth requirements of various communication devices may be better accommodated by providing high bandwidth networks and connections thereto through various enhanced-bandwidth networking technology including DSL, Cable, Ethernet, etc.

As described more fully below, relay service 110 may be configured to provide interpretive services to hearing-impaired user 140. More specifically, a human "call assistant" within relay service 110 may be employed to facilitate a communication session between a hearing-impaired user 140 and a hearing-capable user 160. By way of example only, communication device 190 may comprise a conventional voice phone. As such, hearing-capable user 160 may interact in a conventional manner with communication device 120 through the use of a voice-based dialogue conveyed over communication device 190. The voice of hearing-capable user 160 may be conveyed over communication device 190 and may be transmitted over network 180 to communication device 120. Furthermore, the voice conveyed over communication device 190 may be transmitted through communication device 120, over network 170, and to relay service 110.

By way of example, communication device 120 may include a captioned telephone, a telephone enabled for text enhanced telephony, or any other suitable communication device configured to receive and display text. Hearing-impaired user 140 may interact in a conventional manner with communication device 190 through the use of a voice-based dialogue conveyed over communication device 120. Furthermore, as described more fully below, communication device 120 may be configured to receive and display a text transcription of a voice signal sent from relay service 110 via network 170.

In various embodiments of the disclosure, instructions implementing an "application program" may be tangibly embodied in a computer-readable medium which may include one or more fixed or removable data storage devices, such as a zip drive, floppy disc drive, hard drive, CD-ROM drive, tape drive, flash memory device, etc. Further, an application program may include instructions that, when read and executed by a processor, may cause the processor to perform the steps necessary to implement and/or use embodiments of the disclosure. An application program and/or operating instructions may also be tangibly embodied in a memory and/or data communications devices, thereby making a computer program product or article of manufacture according to an embodiment the disclosure. As such, the term "application program" as used herein is intended to encompass a computer program accessible from any computer readable device or media. Furthermore, portions of an application program may be distributed such that some of the application program may be included on a computer readable media within a processor-based device (e.g., device 102 or device 152) and some of the application program may be included in a removable data storage device.

Figure 2:
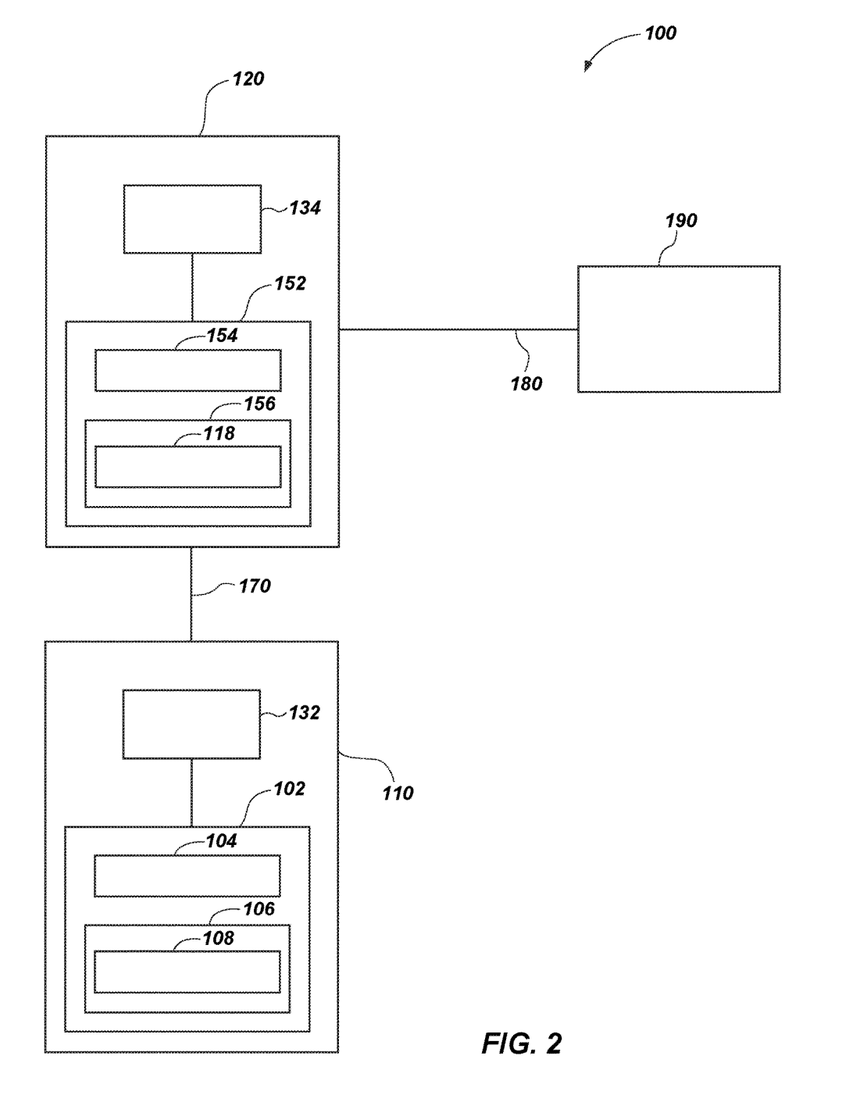
FIG. 2 is a block diagram of the communication system of FIG. 1, according to an embodiment of the disclosure.

FIG. 2 illustrates a block diagram of communication system 100. As illustrated, relay service 110 may include a display device 132 coupled to a processor-based device 102 comprising a processor 104 and a memory 106, such as random access memory (RAM). Device 102 may also implement a compiler (not shown) that allows an application program 108 written in a programming language to be translated into processor 104 readable code. Application program 108 may be configured to access and manipulate data stored in memory 106 of device 102 using relationships and logic that are generated using the compiler.

Communication device 120 may include a display device 134 and a processor-based device 152 comprising a processor 154 and a memory 156, such as random access memory (RAM). Device 152 may also implement a compiler (not shown) that allows an application program 118 to be translated into processor 104 readable code. Application program 118 may be configured to access and manipulate data stored in memory 156 of device 152 using relationships and logic that are generated using the compiler.

During a contemplated operation of communication system 100, hearing-capable user 160 (see FIG. 1) may convey speech into communication device 190, which may then transmit an associated voice signal to communication device 120 over network 180. Communication device 120 may then transmit the voice signal to relay service 110. Upon receipt of a voice signal, a human call assistant (not shown) positioned within relay service 110, may listen to the voice signal transmitted from communication device 120 and "revoice" the words to a speech recognition computer program (not shown) within relay service 110. As will be understood by one having ordinary skill in the art, revoicing is an operation in which the call assistant repeats the words she or he hears upon receipt of the voice signal. The speech recognition program may then output a text transcription of the call assistant's spoken words and, thereafter, the text transcription may be transmitted to communication device 120 via network 170. Hereinafter, a text transcription output from a speed recognition program may also be commonly referred to as a "block" of text. For example, a block of text may comprise one or more words, one or more sentences, one or more lines of text, or any combination thereof.

Hearing-impaired user 140 (see FIG. 1) positioned proximate communication device 120 may receive, via network 180, the voice signal transmitted from communication device 190. Furthermore, a block of a text output from the speech recognition program and associated with the transmitted voice signal may be displayed within a text caption on display device 134 as it is sent from relay service 110 and received by communication device 120. As a result, hearing-impaired user 140 may listen to the voice signal transmitted from communication device 190 and, immediately thereafter, receive a block of text associated with the voice signal. In order to enhance the effectiveness of communication system 100, it is desirable for hearing-impaired user 140 to either receive the block of text as close to real-time as possible, or as close as possible to simultaneous receipt of the voice signal. For example only, hearing-impaired user 140 may listen to the voice signal transmitted from communication device 190 and, within three second or less, receive a block of text associated with the voice signal.

Furthermore, it should be noted that a block of text, as output from the speech recognition program and as transmitted to and displayed within a text caption on display device 134, may also be displayed within a text caption displayed on display device 132. As a result, the call assistant may view the text caption, including one or more blocks of text, as displayed on display device 134 and as viewed by hearing-impaired user 140. Therefore, any errors that may exist in the text caption displayed on display device 134 may also be visible to the communication assistant on display device 132.

In accordance with various embodiments of the disclosure, application program 108 may be configured to provide in-line correction of any errors that may be detected within a text caption displayed on display device 134. Stated another way, application program 108 may be configured to replace any detected errors within a displayed text caption with corrected text. More specifically, in the event the call assistant notices one or more errors within a block of text of the text caption as displayed on each of display device 134 and display device 132, the call assistant may edit the block of text including the one or more errors through input into device 102 to correct the one or more errors. For example only, the call assistant may edit a block of text through input into a keyboard (e.g., selecting and replacing text, inserting text, and/or deleting text). As a result, a corrected block of text including one or more corrected words may be generated. Thereafter, the corrected block of text including the one or more corrected words may be sent to communication device 120. Upon receipt of the corrected block of text at communication device 120, application program 118 may be configured to replace the block of text including the one or more errors with the associated corrected block of text. Furthermore, substantially simultaneously upon replacing the block of text including the one or more errors with the associated corrected block of text, application program 118 may be configured to display the corrected text caption on display device 134.

Furthermore, in order to make a correction more obvious to a hearing-impaired user reading the text caption, application program 108 may further be configured to identify each corrected word within the text caption with an identifier (e.g., a mark or a tag). By way of example and not by way of limitation, application program 108 may be configured to identify each corrected word by highlighting each corrected word displayed in a text caption on display device 134.

Figure 3:
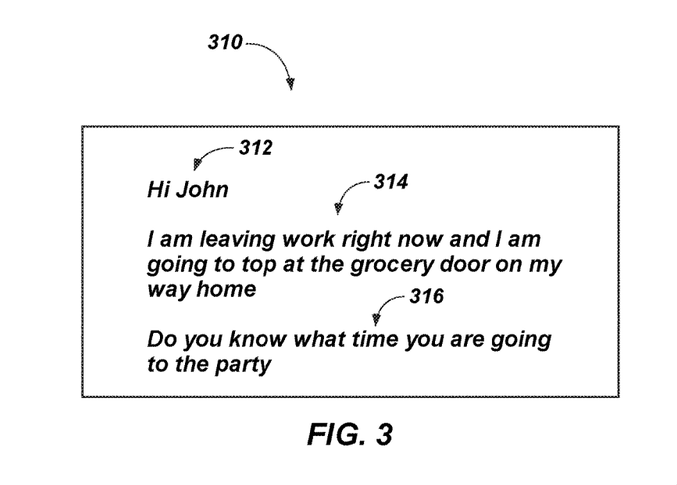
FIG. 3 illustrates a text caption including errors.
Figure 4:
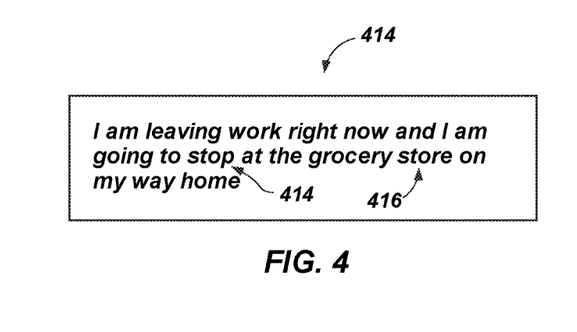
FIG. 4 illustrates a corrected block of text.
Figure 5:
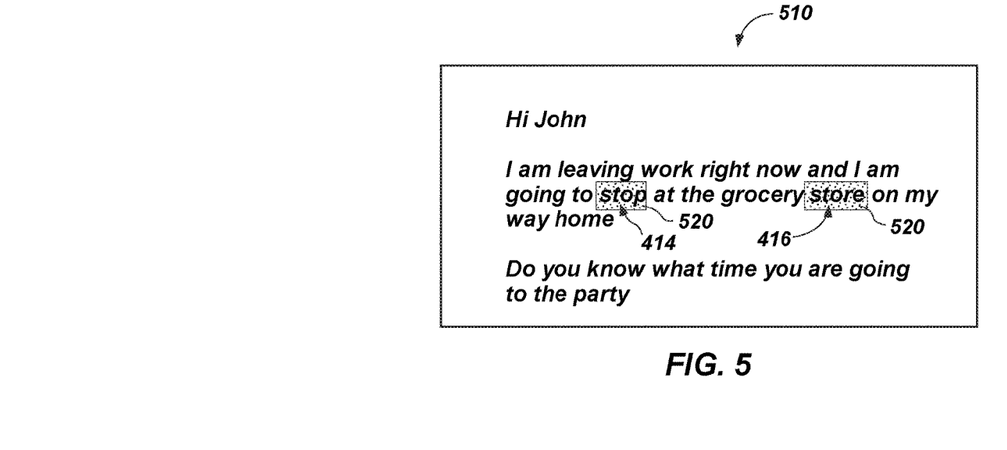
FIG. 5 illustrates a corrected text caption including corrected text and further including identified corrected words, in accordance with an embodiment of the disclosure.

With reference to FIG. 3, a text caption 310 including a plurality of errors is depicted. Furthermore, as illustrated, text caption 310 includes blocks of text 312, 314, and 316. For example, each block of text 312, 314, and 316 may be generated by a speech recognition program and subsequently transmitted from relay service 110 and received by and displayed within text caption 310 displayed on display device 134 (see FIG. 2). Furthermore, text caption 310 may be displayed on display device 132 within relay service 110 (see FIG. 2) visible to a call assistant. In the event the call assistant notices one or more errors within text caption 310, the call assistant may edit the text displayed on display device 132 through input into device 102 to correct the one or more errors and, as a result, may generate a corrected block of text including one or more corrected words. For example, with reference to FIGS. 3 and 4, a call assistant may recognize one or more errors within block 314 and, thereafter, generate a corrected block of text 414 including one or more corrected words 414 and 416. Thereafter, corrected block of text 414 may be transmitted from relay service 110 and received by communication device 120. Block of text 314 may then be replaced by corrected block of text 414, as illustrated in text caption 510 (see FIG. 5). Further, as illustrated in FIG. 5, application program 118 (see FIG. 2) may be configured to display corrected words (i.e., words 414 and 416) within text caption 510 with a marking (i.e., a tag), such as a highlight 520.

It should be noted that a block of text including one or more corrected words may be sent at any suitable time after the call assistant has identified one or more errors and made associated corrections. For example, the call assistant may notice one or more errors in the most recently sent block of text, correct the one or more errors, and transmit a corrected block of text including one or more corrected words prior to sending another block of text. On the other hand, the call assistant may not notice one or more errors in a block of text until after one or more blocks have subsequently been sent. In any event, any block of text displayed on a display device 134 (see FIG. 2) may be replaced with a corrected block of text including one or more corrected words.

Figure 6:
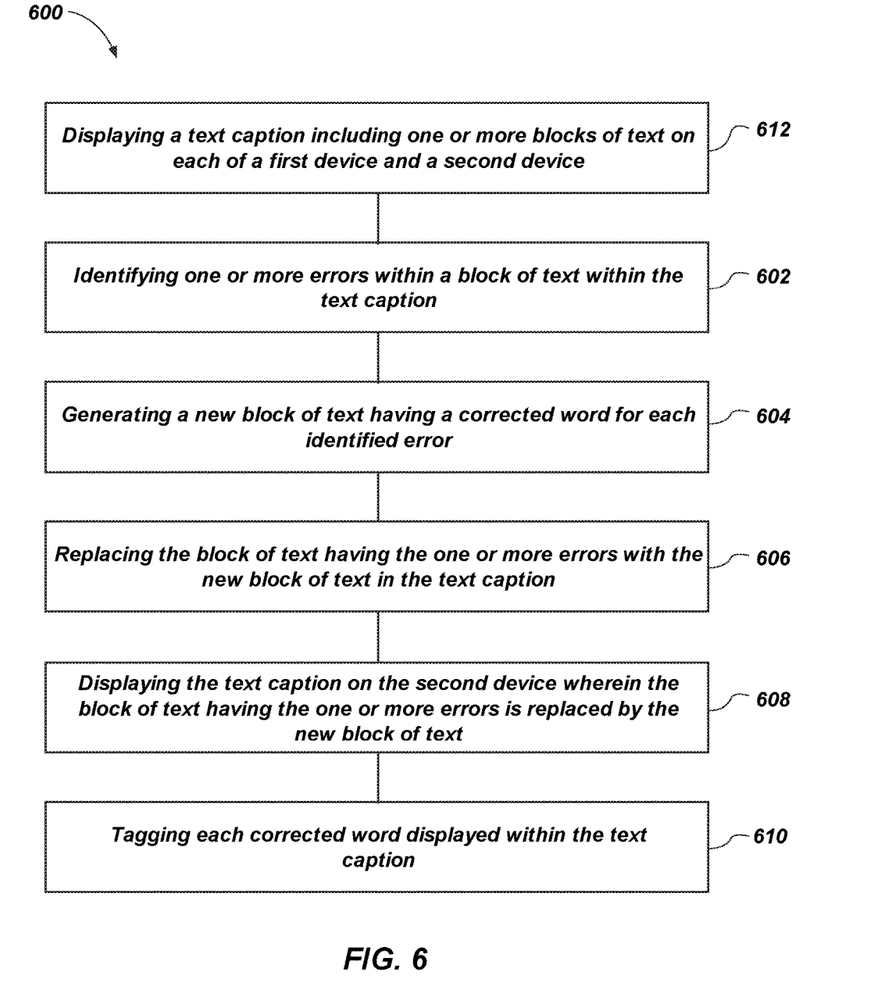
FIG. 6 is a flow chart illustrating a method of providing error correction within a text caption, according to an embodiment of the disclosure.

FIG. 6 is a flow chart illustrating a method 600 of correcting one or more textual errors within a text caption, in accordance with one or more embodiments of the disclosure. Method 600 may include displaying a text caption including one or more blocks of text on each of a first device and a second device 612. Moreover, method 600 may include identifying one or more errors within a block of text within text caption 602 and generating a new block of text having corrected word for each identified error 604. Method 600 may further include replacing the block of text having the one or more errors with the new block of text in the text caption 606. In addition, method 600 may include displaying the text caption on the second device wherein the block of text having the one or more errors is replaced by the new block of text 608. In addition, method 600 may include tagging each corrected word displayed within the text caption 610.

As described above in various embodiments of the disclosure, an error detected in a text caption may be replaced with corrected text (i.e., "in-line" correction) and, therefore, in comparison to conventional text caption correction methods, a user viewing the text caption may be provided with a context of the error correction. Stated another way, upon completion of an error correction within a text caption, a reader may understand how the correction relates to the text caption as a whole and will not be required to guess as to where the correction belongs within the text caption or how the correction applies to the text caption. Furthermore, in comparison to conventional text caption correction methods, in-line correction of a text caption may reduce distractions to a hearing-impaired user and, therefore, interruptions in the flow of conversation between a hearing-capable user and a hearing-impaired user may be reduced.

While the disclosure has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A computer-implement method to provide error correction in a caption-based communication system, the method comprising:
   receiving, at a communication system associated with a captioning service, a voice signal originating from a first communication device for broadcasting at a second communication device during a real-time communication session between the first communication device and the second communication device, the second communication device being associated with a hearing-impaired user;
   generating, at the communication system, a text transcription of the voice signal during the real-time communication session using a speech recognition program;
   providing, from the communication system to the second communication device, a block of text of the text transcription for presentation on an electronic display of the second communication device;
   after providing the block of text to the second communication device, receiving, at the communication system, a correction corresponding to an error in the block of text;
   generating, at the communication system, a replacement block of text responsive to receiving the correction, the replacement block of text including the block of text with the correction to the error in the block of text; and
   providing the replacement block of text, from the communication system to the second communication device, as an inline correction for the error in the block of text with instructions for the second communication device to present the replacement block of text at a location of a presentation of the block of text in the electronic display of the second communication device, the replacement block of text provided only when the block of text is presented on the electronic display of the second communication device.

2. The method of claim 1, wherein the replacement block of text is provided only when the block of text is presented on the electronic display of the second communication device when a real-time conversation is occurring between a user of the first communication device and a user of the second communication device.

3. The method of claim 1, wherein the instructions for the second communication device include the second communication device presenting a visual indication on the electronic display that the replacement block of text has replaced the block of text as presented on the electronic display.

4. The method of claim 3, wherein the visual indication includes a tag on the replacement block of text.

5. The method of claim 4, wherein the tag on the replacement block of text includes highlighting of text corrected in the replacement block of text.

6. The method of claim 1, wherein the correction includes one or more of: replacing text, inserting text, and deleting text.

7. The method of claim 1, wherein the block of text is a first block of text, wherein the text transcription including a plurality of blocks of text that includes the first block of text, each of the plurality of blocks of text including a plurality of words, wherein the first block of text of the plurality of blocks of text being distinguished from a second block of text of the plurality of blocks of text by words in the first block of text being offset from words in the second block of text, the offset between the first block of text and the second block of text being different than spaces between the words in the first block of text and the words in the second block of text when the first and second blocks of text are presented on an electronic display of the second communication device.

8. The method of claim 7, further comprising after providing the first block of text, providing, from the communication system to the second communication device, a second block of text of the plurality of blocks of text for presentation on an electronic display of the second communication device,
   wherein receiving the correction occurs after providing the second block of text such that the replacement block of text is provided while the second block of text is presented in the electronic display of the second communication device.

9. A computer-implement method to provide error correction in a caption-based communication system, the method comprising:
   receiving, at a communication system associated with a captioning service, a voice signal originating from a first communication device for broadcasting at a second communication device during a real-time communication session between the first communication device and the second communication device, the second communication device being associated with a hearing-impaired user;
   generating, at the communication system, a text transcription of the voice signal during the real-time communication session using a speech recognition program, the text transcription including a plurality of blocks of text that each include a plurality of words, a first block of text of the plurality of blocks of text being distinguished from a second block of text of the plurality of blocks of text by words in the first block of text being offset from words in the second block of text, the offset between the first block of text and the second block of text being different than spaces between the words in the first block of text and the words in the second block of text when the first and second blocks of text are presented on an electronic display of the second communication device;

providing, from the communication system to the second communication device, the first block of text of the plurality of blocks of text for presentation on an electronic display of the second communication device;

after providing the first block of text, providing, from the communication system to the second communication device, the second block of text of the plurality of blocks of text for presentation on an electronic display of the second communication device;

after providing the second block of text to the second communication device, receiving, at the communication system, a correction corresponding to an error in the first block of text;

generating, at the communication system, a replacement block of text responsive to receiving the correction, the replacement block of text including the first block of text with the correction to the error in the first block of text; and providing the replacement block of text, from the communication system to the second communication device, as an inline correction for the error in the first block of text with instructions for the second communication device to present the replacement block of text at a present location of a presentation of the first block of text in the electronic display of the second communication device while the second block of text is presented in the electronic display of the second communication device.

10. The method of claim 9, wherein the instructions for the second communication device include the second communication device presenting a visual indication on the electronic display that the replacement block of text has replaced the block of text as presented on the electronic display.

11. The method of claim 10, wherein the visual indication includes a tag on the replacement block of text.

12. The method of claim 11, wherein the tag on the replacement block of text includes highlighting of text corrected in the replacement block of text.

13. The method of claim 9, wherein the correction includes one or more of: replacing text, inserting text, and deleting text.

14. The method of claim 9, wherein the replacement block of text is provided to the second communication device only when the first block of text is presented on the electronic display of the second communication device.

15. The method of claim 14, wherein the instructions for the second communication device include the second communication device presenting a visual indication on the electronic display that the replacement block of text has replaced the block of text as presented on the electronic display.

16. One or more non-transitory computer-readable media that include instructions that then performed by one or more computing systems perform operations, the operations comprising:
receiving, at a communication system associated with a captioning service, a voice signal originating from a first communication device for broadcasting at a second communication device during a real-time communication session between the first communication device and the second communication device, the second communication device being associated with a hearing-impaired user;
generating, at the communication system, a text transcription of the voice signal during the real-time communication session using a speech recognition program;
providing, from the communication system to the second communication device, a block of text of the text transcription for presentation on an electronic display of the second communication device;
after providing the block of text to the second communication device, receiving, at the communication system, a correction corresponding to an error in the block of text;
generating, at the communication system, a replacement block of text responsive to receiving the correction, the replacement block of text including the block of text with the correction to the error in the block of text; and
providing the replacement block of text, from the communication system to the second communication device, as an inline correction for the error in the block of text with instructions for the second communication device to present the replacement block of text at a location of a presentation of the block of text in the electronic display of the second communication device, the replacement block of text provided only when the block of text is presented on the electronic display of the second communication device.

17. The non-transitory computer-readable media of claim 16, wherein the replacement block of text is provided only when the block of text is presented on the electronic display of the second communication device when a real-time conversation is occurring between a user of the first communication device and a user of the second communication device.

18. The non-transitory computer-readable media of claim 16, wherein the instructions for the second communication device include the second communication device presenting a visual indication on the electronic display that the replacement block of text has replaced the block of text as presented on the electronic display.

19. The non-transitory computer-readable media of claim 18, wherein the visual indication includes a tag on the replacement block of text.

20. The non-transitory computer-readable media of claim 19, wherein the tag on the replacement block of text includes highlighting of text corrected in the replacement block of text.

* * * * *